(12) United States Patent
Ham et al.

(10) Patent No.: US 9,641,657 B1
(45) Date of Patent: May 2, 2017

(54) PROVIDING SATELLITE COMMUNICATION CAPABILITIES TO EXISTING COMMUNICATION DEVICES, INCLUDING A COMMON SMART PHONE

(71) Applicant: XPLOTRAX Inc., Colorado Springs, CO (US)

(72) Inventors: Christopher Ham, Las Cruces, NM (US); Kimball Edwards, Colorado Springs, CO (US); Brandon Tripp, Colorado Springs, CO (US); Michael Jones, Las Cruces, NM (US); David Zoller, Las Cruces, NM (US); Joshua Russell, Las Cruces, NM (US); Thomas Wright, Albuquerque, NM (US); Jessica Apodaca, Las Cruces, NM (US)

(73) Assignee: XPLOTRAX Inc., Colorado Springs, CO (US)

( * ) Notice: Subject to any disclaimer, the term of this patent is extended or adjusted under 35 U.S.C. 154(b) by 0 days.

(21) Appl. No.: 14/991,702

(22) Filed: Jan. 8, 2016

Related U.S. Application Data

(60) Provisional application No. 62/101,103, filed on Jan. 8, 2015.

(51) Int. Cl.
| | | |
|---|---|---|
| *H04M 1/00* | (2006.01) |
| *H04M 1/02* | (2006.01) |
| *H04W 84/06* | (2009.01) |
| *H04W 88/06* | (2009.01) |

(52) U.S. Cl.
CPC ............ *H04M 1/026* (2013.01); *H04W 84/06* (2013.01); *H04W 88/06* (2013.01)

(58) Field of Classification Search
CPC ...... H04W 4/008; H04W 4/22; H04W 76/007
USPC ....... 455/41.2, 12.1, 427, 556.1; 342/357.31, 342/357.39, 357.22; 343/904, 907
See application file for complete search history.

(56) References Cited

U.S. PATENT DOCUMENTS

| | | | | |
|---|---|---|---|---|
| 6,549,788 B1 * | 4/2003 | Karabinis | .............. | H01Q 1/088 343/702 |
| 7,098,855 B2 * | 8/2006 | Kotzin | .................. | H01Q 1/242 343/702 |
| 8,489,063 B2 * | 7/2013 | Petite | ...................... | H04W 4/12 340/546 |
| 2013/0082828 A1 * | 4/2013 | Furey | ...................... | G08B 1/08 340/286.01 |

* cited by examiner

*Primary Examiner* — Sonny Trinh
(74) *Attorney, Agent, or Firm* — Justin R. Jackson; Deborah A. Peacock; Peacock Myers, P.C.

(57) ABSTRACT

A system and apparatus which permits an existing communication device, such as a common smart phone, to have satellite communication capabilities. The apparatus can include a transmitter/receiver which can relay communications and data, between the existing communications device and a satellite network. Optionally, the data can be encrypted before being sent over the satellite network. Optionally, the transmitter/receiver can have a distress activation input which can automatically emit an SOS signal along with the transmitter/receiver's current GPS coordinates when a user activates the input.

20 Claims, 3 Drawing Sheets

PROVIDING SATELLITE COMMUNICATION CAPABILITIES TO EXISTING COMMUNICATION DEVICES, INCLUDING A COMMON SMART PHONE

CROSS-REFERENCE TO RELATED APPLICATIONS

This application claims priority to and the benefit of the filing of U.S. Provisional Patent Application Ser. No. 62/101,103, entitled "Global Visualization and Information System", filed on Jan. 8, 2015, and the specification thereof is incorporated herein by reference.

STATEMENT REGARDING FEDERALLY SPONSORED RESEARCH OR DEVELOPMENT

Not Applicable.

BACKGROUND OF THE INVENTION

Field of the Invention (Technical Field)

Embodiments of the present invention provide the ability to send Navigation and Timing data, Short Message Service (SMS) text messages, and Multimedia Messaging Service (MMS) picture files from any Bluetooth enabled device anywhere in the world. Embodiments of the present invention also include an on-board Universal Serial Bus (USB) interface and an asynchronous serial interface that allows data to be sent and/or received from a host of compatible peripheral devices.

Description of Related Art

The ability to send text messages and navigation coordinates using hand-held devices is readily available from a variety of information technology (IT) companies. These devices operate in conjunction with the IT service provider's terrestrial cellular network or other wireless technology. However once the hand-held device is outside cellular coverage the user loses connectivity and the ability to send or receive data until such time as the device re-connects with the network. Embodiments of the present invention utilize both cellular and satellite coverage to provide the user with connectivity regardless of the location of the hand-held device.

BRIEF SUMMARY OF EMBODIMENTS OF THE PRESENT INVENTION

An embodiment of the present invention relates to a communications system that can have a transmitter/receiver apparatus which itself can have Bluetooth communications electronics, a GPS receiver, and a satellite communications modem—the GPS receiver and the satellite communications modem sharing a single high gain helix antenna; and a software application, stored on a tangible non-transitive memory-storage device of a communications apparatus which is not the transmitter/receiver apparatus and the software application containing instructions which cause a microprocessor or microcontroller of the communications apparatus to cause a Bluetooth antenna of the communications apparatus to emit electromagnetic radiation and thereby communicate wirelessly with the Bluetooth communications electronics of the transmitter/receiver apparatus.

Optionally the transmitter/receiver apparatus can also have a distress activation input. In one embodiment, the communications apparatus can include a smart phone. The transmitter/receiver apparatus can also optionally include a USB port. The transmitter/receiver apparatus can also include software that encrypts data before sending it to the satellite communications modem for transmission.

In one embodiment, the transmitter/receiver apparatus can include a rechargeable battery, which itself can optionally be electrically connected such that it can be charged through a USB port.

An embodiment of the present invention also relates to a communications system having a transmitter/receiver apparatus which itself has Bluetooth communications electronics, a GPS receiver, and a satellite communications modem; and a software application, stored on a tangible non-transitive memory-storage device of a cellular telephone, the software application containing instructions which cause a microprocessor or microcontroller of the cellular telephone to cause a Bluetooth antenna to emit electromagnetic radiation and thereby communicate wirelessly with the Bluetooth communications electronics of the transmitter/receiver apparatus; and the transmitter/receiver apparatus is not a cellular telephone. The GPS receiver and the satellite communications modem can share a single antenna and that single antenna can optionally comprise a high gain helix antenna.

An embodiment of the present invention also relates to a communications system having a transmitter/receiver apparatus which itself includes a GPS receiver, a satellite communications modem, and a USB port—the GPS receiver and the satellite communications modem sharing a single antenna; and the communications system has a software application, stored on a tangible non-transitive memory-storage device of a communications apparatus containing instructions which cause a microprocessor or microcontroller of the communications apparatus to communicate with the transmitter/receiver apparatus via the USB port. Optionally, the communications apparatus can include a cellular telephone.

An embodiment of the present invention also relates to a communications system having a transmitter/receiver apparatus which itself has Bluetooth communications electronics, and a satellite communications modem; and a software application, stored on a tangible non-transitive memory-storage device of a communications apparatus which is not said transmitter/receiver apparatus and said software application containing instructions which cause a microprocessor or microcontroller of the communications apparatus to cause a Bluetooth antenna of the communications apparatus to emit electromagnetic radiation and thereby communicate wirelessly with said Bluetooth communications electronics of said transmitter/receiver apparatus.

Yet another embodiment of the present invention relates to a transmitter/receiver apparatus having Bluetooth communications electronics, a GPS receiver, and a satellite communications modem, the GPS receiver and the satellite communications modem sharing a single high gain helix antenna. The transmitter/receiver apparatus can also include a USB port and/or a distress activation input.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1:
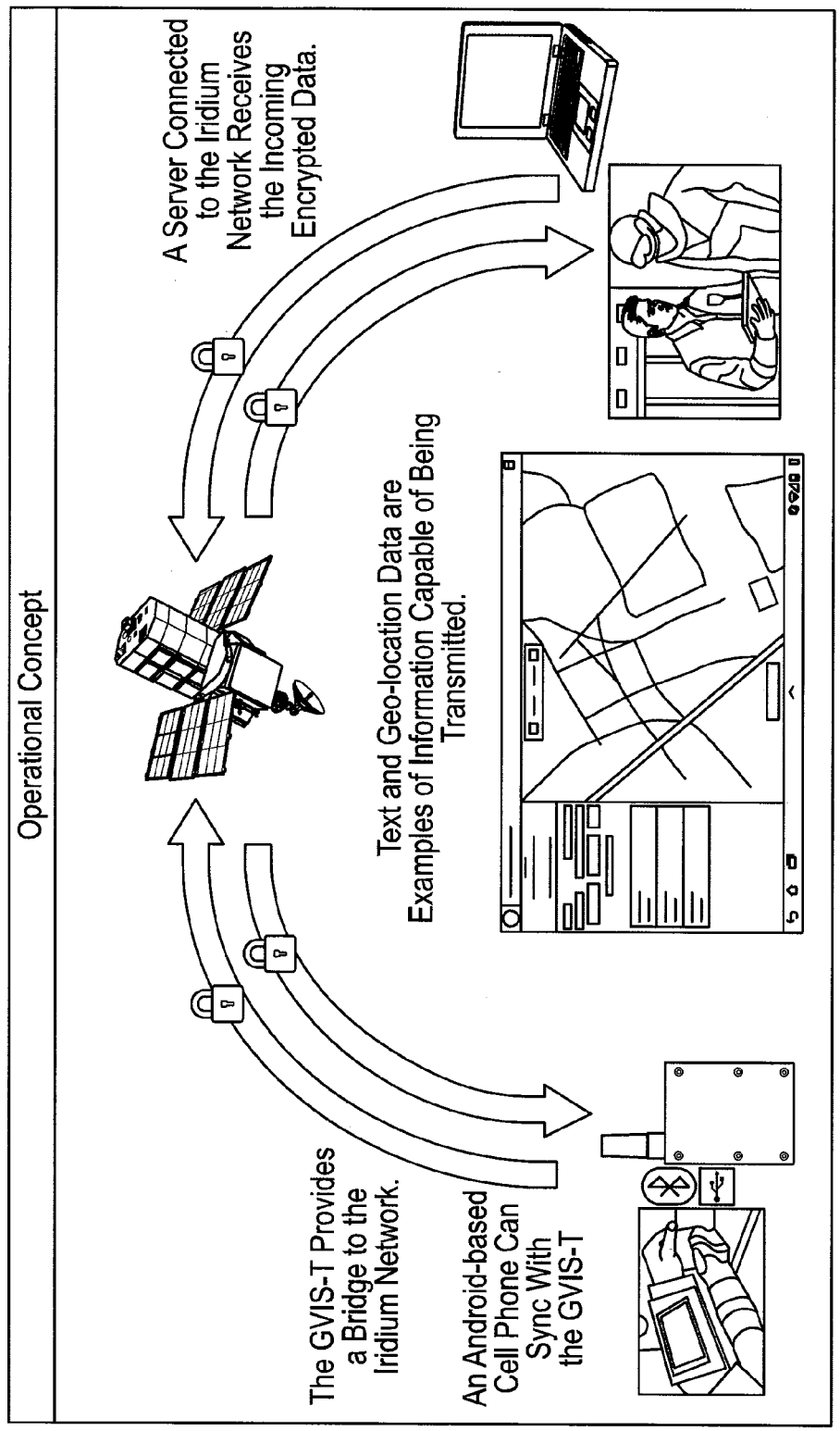
FIG. 1 is a drawing which illustrates a system according to an embodiment of the present invention which can send text and geo-location data through a satellite network.

Referring now to the drawings, an embodiment of the present invention, hereinafter referred to as a global visualization and information system ("GVIS"), includes apparatus 10, used in conjunction with a software application. Apparatus 10 is preferably a small, light weight portable device. The software application is preferably installed on a user's communication device, which can optionally include a cell phone, tablet, laptop, desktop or server computer. Embodiments of the present invention can allow for the sending and receiving of text messages, photographs and tracking data over cellular, Wi-Fi, or satellite constellation, including IRIDIUM®, a registered trademark of Iridium Satellite LLC., using the GVIS device. Embodiments of the present invention also grant the user personal situational awareness with the ability to track other GVIS users within their domain or workgroup.

In one embodiment, the default connectivity is preferably to a user's normal cellular network infrastructure. If the user's communication device is not connected to its normal network (for example, if the user is out of range of a cellular tower and thus has no cell service), then the user's communication device can send or receive information to/from apparatus 10 using Bluetooth and/or a USB interface. Apparatus 10 can send or receive the data over the satellite network, thus providing the user with global communication which relies primarily on his or her normal cellular network, but which provides satellite communication when the user is out of range of their typical network. The data is preferably transferred to a secure server where it is stored and forwarded to a recipient's device. Optionally, a remote user can log into the secure server to review or download the data history.

Optionally, all data sent or received over the cellular and satellite networks can be encrypted using up to a 512-bit Advanced Encryption Standard ("AES") algorithm. The data can be time stamped and optionally includes the user's coordinates. Coordinates can be generated from the user's cell phone, or from a global positioning satellite ("GPS") chip which can be incorporated into the GVIS. Data can be transmitted over the satellite network using the Short Burst Data service.

In one embodiment, apparatus 10 can include enclosure 12 which can be formed from any material suitable for containing and protecting the internal electronics from the outside elements, including but not limited to one or more metals, including aluminum, one or more plastics, including but not limited to an impact resistant plastic, an elastic material, a fiberglass material, combinations thereof and the like. Enclosure 12 preferably houses electronics which themselves can include one or more printed circuit boards. A combined satellite communications and GPS antenna 13 is preferably attached to the top of the enclosure.

Apparatus 10 also preferably includes internal power supply 14, which can include but is not limited to a rechargeable battery. Battery 14 is preferably enclosed within a battery compartment of housing 12. The battery compartment is preferably quickly accessible for a user to enable easy battery replacement.

Universal Serial Bus ("USB") port 16 is preferably provided and can be electrically connected such that battery 14 can be charged through port 16. USB port 16 also optionally provides the ability for a user's communication device to electrically connect directly to apparatus 10 such that Bluetooth communication is not required between apparatus 10 and the user's communication device.

In one embodiment, apparatus 10 can include distress activation input 17, which can include a button. In this embodiment, if a user activates input 17, for example by depressing a button for three seconds, then apparatus 10 can be placed into a distress mode. Apparatus 10 can be pre-programmed to perform one or more desired functions upon activation of distress mode. For example, in one embodiment, once a user presses a distress button, apparatus 10 can continuously or intermittently transmit an SOS signal along with the GPS coordinates.

Apparatus 10 can optionally include indicia 18 to indicate that Bluetooth communication is enabled or disabled. For example, in one embodiment, indicia 18 can include a light emitting diode ("LED") or other graphical indicia that can be activated or otherwise indicate that Bluetooth is enabled and/or disabled. On/off button 20, which can optionally comprise one or more buttons or switches, is preferably provided to selectively activate and deactivate power to apparatus 10. Battery status indicator 22 can also be provided on apparatus 10 such that a user can easily determine the amount of charge left in a battery.

In one embodiment, a plurality of electronic assemblies can be provided in apparatus 10. In this embodiment, a first electronic assembly can include a first printed circuit board that provides the interface for the battery and the various buttons which form the keypad. It can also include the electronic components to control the functions of apparatus 10 and to charge the battery.

A second electronic assembly is also provided. The second electronic assembly can include a second printed circuit board which itself can include the components which form the GPS system, the satellite communications network modem, the Bluetooth communications capabilities, the USB interface, and microprocessor components. It preferably connects to the first circuit board and to a high gain helix antenna 13. One unique feature of this assembly is that it preferably has the ability to receive GPS and to transmit and receive data over the satellite network while only using a single antenna. Using a single antenna reduces the weight and overall size of apparatus 10 without degrading performance.

Figure 2:
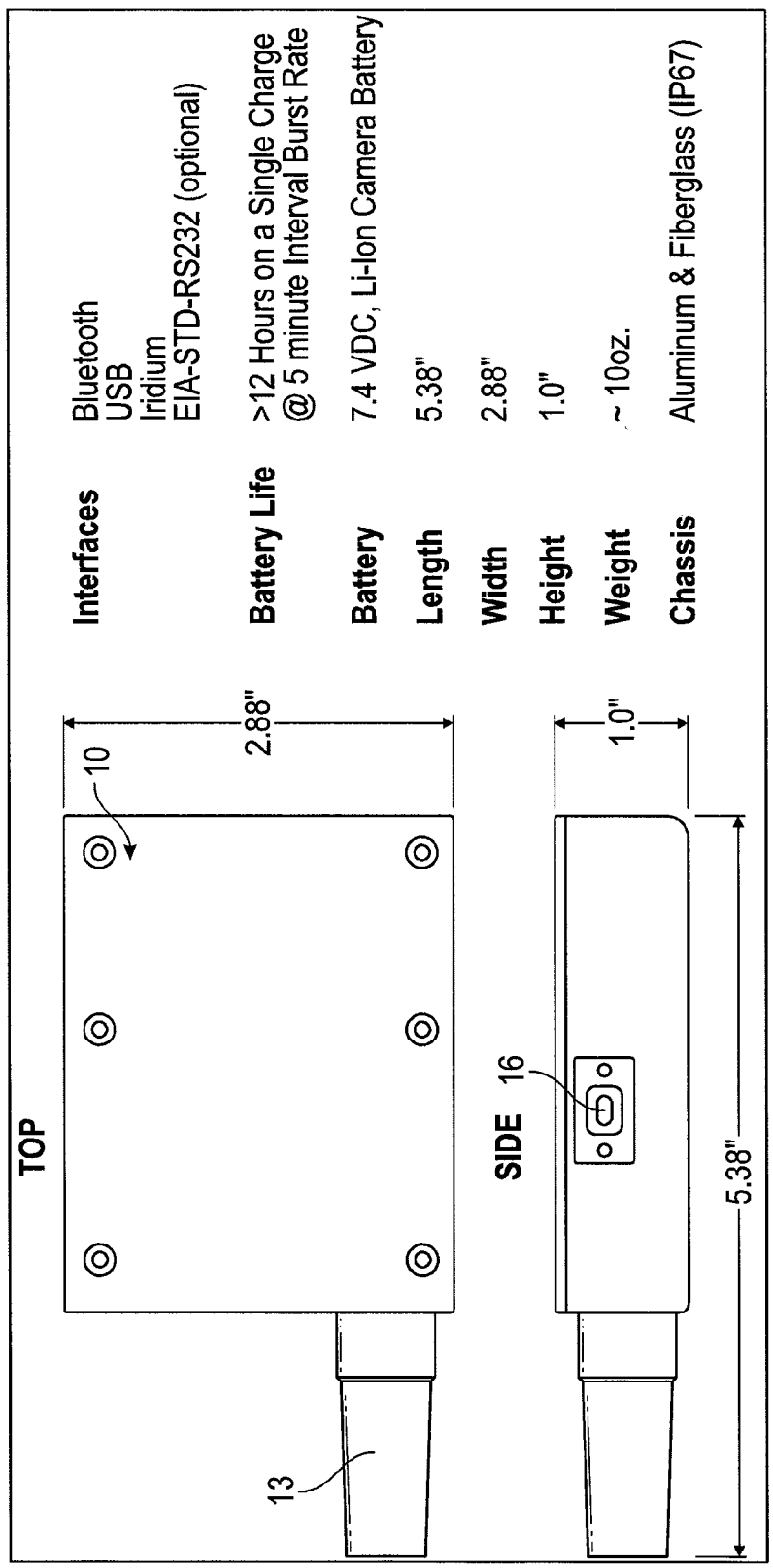
FIGS. 2 and 3 are drawings which illustrate a transmitter/receiver apparatus according to an embodiment of the present invention.
Figure 3:
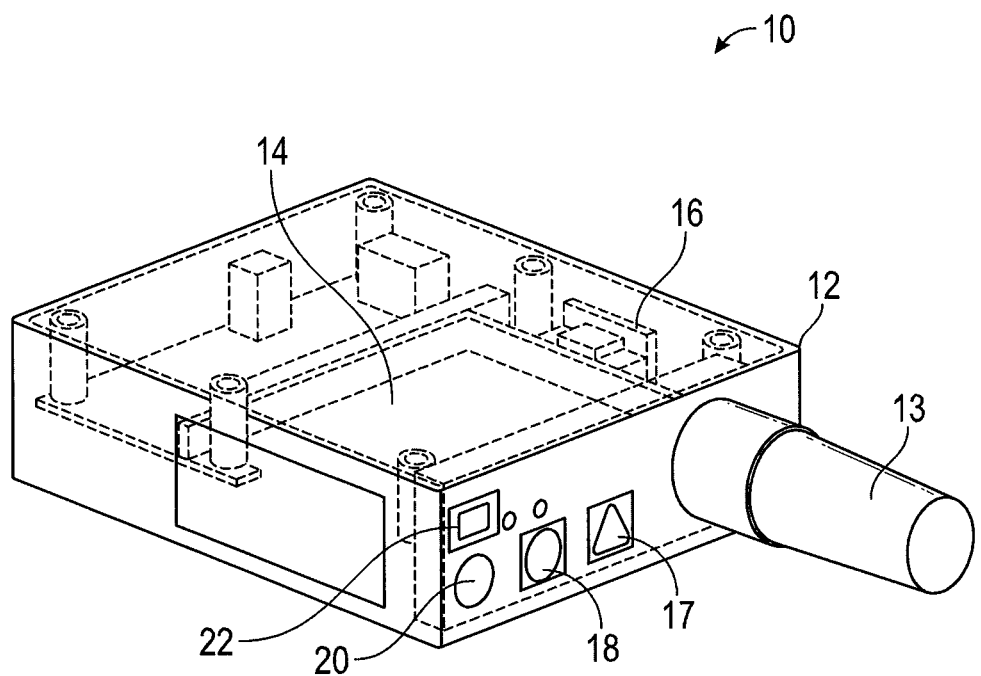

Note that although FIGS. 1, 2, and 3 illustrate and/or recite specific details, these details are only intended to inform the user of a preferred embodiment and are not essential features of the invention. Other details, dimensions, and components can be used instead of those listed in the drawings and can provide desirable results.

In one embodiment, apparatus 10 comprises a transmitter and receiver ("transmitter/receiver") apparatus which interfaces with a smart phone via a software application that is installed on the phone. In this embodiment, the software application automatically detects when the cell phone is out of range of any cell towers and when that occurs, the application communicates, optionally via a wireless Bluetooth with apparatus 10, which itself acts as an interface for the smart phone to a satellite network. Embodiments of the present invention are not required to include a smart phone or a cellular telephone, but can instead include any communication apparatus. In one embodiment, the present invention can include the transmitter/receiver apparatus as a stand-alone device and thus need not include any additional communications device.

Optionally, embodiments of the present invention can include a general or specific purpose computer or distributed system programmed with computer software implementing steps described above, which computer software may be in any appropriate computer language, including but not limited to C++, FORTRAN, BASIC, Java, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements. One or more processors and/or microcontrollers can operate via instructions of the computer code and the software is preferably stored on one or more tangible non-transitive memory-storage devices.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A communications system comprising:
    a transmitter/receiver apparatus comprising:
        Bluetooth communications electronics;
        a GPS receiver;
        a satellite communications modem; and
        said GPS receiver and said satellite communications modem sharing a single high gain helix antenna; and
    a software application, stored on a tangible non-transitive memory-storage device of a communications apparatus which is not said transmitter/receiver apparatus and said software application containing instructions for detecting when a cellular network is unavailable and which software application then causes a microprocessor or microcontroller of the communications apparatus to cause a Bluetooth antenna of the communications apparatus to emit electromagnetic radiation and thereby communicate wirelessly with said Bluetooth communications electronics of said transmitter/receiver apparatus.

2. The communications system of claim 1 wherein said transmitter/receiver apparatus further comprises a distress activation input.

3. The communications system of claim 1 wherein the communications apparatus comprises a smart phone.

4. The communications system of claim 1 wherein said transmitter/receiver apparatus further comprises a USB port.

5. The communications system of claim 1 wherein said transmitter/receiver apparatus comprises software that encrypts data before sending it to said satellite communications modem for transmission.

6. The communications system of claim 1 wherein said transmitter/receiver apparatus comprises a rechargeable battery.

7. The communications system of claim 1 wherein said rechargeable battery is electrically connected such that it can be charged through a USB port.

8. A communications system comprising:
    a transmitter/receiver apparatus comprising:
        Bluetooth communications electronics;
        a GPS receiver; and
        a satellite communications modem;
    a software application, stored on a tangible non-transitive memory-storage device of a cellular telephone, said software application containing instructions for detecting when a cellular network is unavailable and which software application then causes a microprocessor or microcontroller of the cellular telephone to cause a Bluetooth antenna to emit electromagnetic radiation and thereby communicate wirelessly with said Bluetooth communications electronics of said transmitter/receiver apparatus; and
    said transmitter/receiver apparatus not comprising a cellular telephone.

9. The communications system of claim 8 wherein said GPS receiver and said satellite communications modem share a single antenna.

10. The communications system of claim 9 wherein said single antenna comprises a high gain helix antenna.

11. The communications system of claim 8 wherein said transmitter/receiver apparatus further comprises a USB port.

12. The communications system of claim 8 wherein said transmitter/receiver apparatus comprises software stored on tangible non-transitive memory-storage and said software containing instructions which cause a microprocessor or microcontroller to encrypt data before it is sent to said satellite communications modem for transmission.

13. A communications system comprising:
    a transmitter/receiver apparatus comprising:
        a GPS receiver;
        a satellite communications modem;
        a USB port; and
        said GPS receiver and said satellite communications modem sharing a single antenna; and
    a software application, stored on a tangible non-transitive memory-storage device of a communications apparatus containing instructions for detecting when a cellular network is unavailable and which software application then causes a microprocessor or microcontroller of the communications apparatus to communicate with said transmitter/receiver apparatus via said USB port.

14. The communications system of claim 13 wherein said single antenna comprises a high gain helix antenna.

15. The communications system of claim 13 wherein the communications apparatus comprises a cellular telephone.

16. The communications system of claim 13 wherein the communications apparatus does not comprise said transmitter/receiver apparatus.

17. A communications system comprising:
    a transmitter/receiver apparatus comprising:
        Bluetooth communications electronics; and
        a satellite communications modem; and a software application, stored on a tangible non-transitive memory-storage device of a communications apparatus which is not said transmitter/receiver apparatus and said software application containing instructions for detecting when a cellular network is unavailable and which software application then causes a microprocessor or microcontroller of the communications apparatus to cause a Bluetooth antenna of the communications apparatus to emit electromagnetic radiation and thereby communicate wirelessly with said Bluetooth communications electronics of said transmitter/receiver apparatus.

18. A communications system comprising:
a transmitter/receiver apparatus comprising:
   Bluetooth communications electronics;
   a satellite communications modem; and
   a high gain helix antenna; and
a software application, stored on a tangible non-transitive memory-storage device of a communications apparatus which is not said transmitter/receiver apparatus and said software application containing instructions for detecting when a cellular network is unavailable and which software application then causes a microprocessor or microcontroller of the communications apparatus to cause a Bluetooth antenna of the communications apparatus to emit electromagnetic radiation and thereby communicate wirelessly with said Bluetooth communications electronics of said transmitter/receiver apparatus.

19. The communications system of claim 18 further comprising a USB port.

20. The communications system of claim 18 further comprising a distress activation input.

* * * * *